United States Patent
Hoffmann et al.

(10) Patent No.: US 10,920,710 B2
(45) Date of Patent: Feb. 16, 2021

(54) METHOD FOR IDENTIFYING FAULTY COMPONENTS OF A FUEL INJECTION SYSTEM

(71) Applicant: CONTINENTAL AUTOMOTIVE GMBH, Hannover (DE)

(72) Inventors: Robert Hoffmann, Ruhstorf/Rott (DE); Peter Matthias Ruße, Tegernheim (DE); Tany Gargiso, Donaustauf (DE); Michael Kausche, Regensburg (DE)

(73) Assignee: Vitesco Technologies GMBH, Hannover (DE)

( * ) Notice: Subject to any disclaimer, the term of this patent is extended or adjusted under 35 U.S.C. 154(b) by 351 days.

(21) Appl. No.: 15/887,125

(22) Filed: Feb. 2, 2018

(65) Prior Publication Data

US 2018/0156154 A1  Jun. 7, 2018

Related U.S. Application Data

(63) Continuation of application No. PCT/EP2016/067624, filed on Jul. 25, 2016.

(30) Foreign Application Priority Data

Aug. 3, 2015 (DE) ...................... 10 2015 214 780.0

(51) Int. Cl.
*F02D 41/14* (2006.01)
*F02D 41/40* (2006.01)
(Continued)

(52) U.S. Cl.
CPC ........... *F02D 41/40* (2013.01); *F02D 41/008* (2013.01); *F02D 41/14* (2013.01);
(Continued)

(58) Field of Classification Search
CPC combination set(s) only.
See application file for complete search history.

(56) References Cited

U.S. PATENT DOCUMENTS 7,881,857 B2 * 2/2011 Samenfink .......... F02D 41/2467
  701/105
8,919,325 B2 * 12/2014 Pursifull ............ F02M 21/0239
  123/198 D
(Continued)

FOREIGN PATENT DOCUMENTS

| CN | 101688491 A | 3/2010 |
| CN | 101765709 A | 6/2010 |

(Continued)

OTHER PUBLICATIONS

International Search Report and Written Opinion dated Oct. 24, 2016 from corresponding International Patent Application No. PCT/EP2016/067624.
(Continued)

*Primary Examiner* — Adam D Tissot

(57) ABSTRACT

A method for identifying faulty components of a fuel injection system is disclosed, wherein a secondary injection is performed individually by each injector during a test routine, after the secondary injection several predefined parameters of the fuel injection system are determined, and a combined assessment of the determined parameters is used to draw conclusions about whether or not components of the fuel injection system are faulty.

17 Claims, 3 Drawing Sheets

(51) Int. Cl.
    *F02D 41/00*     (2006.01)
    *F02D 41/22*     (2006.01)
    *F02D 41/24*     (2006.01)

(52) U.S. Cl.
    CPC ..... *F02D 41/1454* (2013.01); *F02D 41/1495* (2013.01); *F02D 41/1497* (2013.01); *F02D 41/22* (2013.01); *F02D 41/221* (2013.01); *F02D 41/222* (2013.01); *F02D 41/247* (2013.01); *F02D 41/405* (2013.01); *F02D 2041/224* (2013.01); *F02D 2200/0614* (2013.01); *Y02T 10/40* (2013.01)

(56) References Cited

U.S. PATENT DOCUMENTS

| | | | |
|---|---|---|---|
| 9,068,524 B2 | 6/2015 | Malik | |
| 2007/0227506 A1* | 10/2007 | Perryman | F02D 41/2096 123/479 |
| 2008/0294326 A1* | 11/2008 | Andren | F02D 41/1497 701/103 |
| 2009/0177366 A1 | 7/2009 | Achleitner et al. | |
| 2009/0312941 A1* | 12/2009 | Wang | F02D 35/023 701/114 |
| 2009/0326788 A1 | 12/2009 | Yuasa et al. | |
| 2010/0191443 A1 | 7/2010 | Breitbach et al. | |
| 2011/0048374 A1* | 3/2011 | McAlister | F02M 57/06 123/436 |
| 2011/0224888 A1* | 9/2011 | Girotto | F02D 41/123 701/103 |
| 2012/0283934 A1 | 11/2012 | Topp et al. | |
| 2014/0311453 A1 | 10/2014 | Christ et al. | |
| 2017/0030281 A1* | 2/2017 | Willis | F02D 41/22 |
| 2017/0350340 A1* | 12/2017 | Sarwar | F01N 3/20 |

FOREIGN PATENT DOCUMENTS

| | | |
|---|---|---|
| CN | 102428264 A | 4/2012 |
| CN | 102644515 A | 8/2012 |
| CN | 102812226 A | 12/2012 |
| CN | 103797233 A | 5/2014 |
| DE | 102005040551 A1 | 3/2007 |
| DE | 102006023468 B3 | 9/2007 |
| DE | 102007034335 A1 | 1/2009 |
| DE | 102010004299 B3 | 1/2011 |
| DE | 102009046419 A1 | 5/2011 |
| EP | 0844380 A2 | 5/1998 |
| EP | 1420157 A2 | 5/2004 |
| EP | 2019195 A1 | 1/2009 |
| EP | 2136058 A1 | 12/2009 |
| EP | 2796690 A1 | 10/2014 |
| JP | 2009030603 A | 2/2009 |
| JP | 2013108403 A | 6/2013 |
| KR | 20080069972 A | 10/2008 |
| KR | 20110132366 A | 12/2011 |
| WO | 2004046530 A1 | 6/2004 |
| WO | 2009013058 A1 | 1/2009 |

OTHER PUBLICATIONS

German Office Action dated Jul. 17, 2016 for corresponding German Patent Application No. 10 2015 214 780.0.
Korean Notice to Submit Response dated Dec. 20, 2018 for the counterpart Korean Application No. 10-2018-7003150.
Korean Notice of Allowance dated May 2, 2019 for the counterpart Korean Application No. 10-2018-7003150.
Chinese First Office Action dated Jul. 2, 2020 for the counterpart Chinese Application No. 201680045639.4.

* cited by examiner

METHOD FOR IDENTIFYING FAULTY COMPONENTS OF A FUEL INJECTION SYSTEM

CROSS REFERENCE TO RELATED APPLICATIONS

This application claims the benefit of International application No. PCT/EP2016/067624, filed Jul. 25, 2016, which claims priority to German patent application No. 10 2015 214 780.0, filed Aug. 8, 2015, each of which is hereby incorporated by reference herein in its entirety.

FIELD OF INVENTION

The invention concerns a method for identifying faulty components of a fuel injection system.

BACKGROUND

Fuel injection systems of internal combustion engines must fulfil legal requirements in relation to on-board diagnosis (OBD). The relevant standards and laws concerning this are for example for Europe UN/ECE R83, and for the Californian market the California Code of Regulations, Title 13, 1968.2.

A temporary or sustained deviation of the fuel injection quantity from a fuel injection quantity which is optimal for the momentary operating point of the internal combustion engine, must be able to be diagnosed quickly and reliably. This diagnosis capability must be maintained over the entire service life of the motor vehicle equipped with the internal combustion engine. If this is not the case, the pollutant emissions of the motor vehicle will deteriorate, so that in many cases legal regulations cannot be observed. It is also possible that such a motor vehicle will suffer engine damage.

It is already known to provide monitoring of the injection quantity using a single physical signal, for example the rail pressure signal or injector voltage. Each signal used for OBD must be sufficiently checked for plausibility according to valid regulations. In known OBD systems, furthermore the problem arises that small injection quantities only provoke small signal strokes at the sensors available, for example a rail pressure sensor or a lambda sensor.

Usually, various types of interference are present in the immediate vicinity of the engine concerned. These include, for example, general noise. No distinction is made between irradiated noise, conducted noise and capacitively coupled noise, and also no distinction is made between different locations of the interference source. Furthermore, lambda sensors have a cross-sensitivity to hydrocarbons and other exhaust gas constituents. The sensor may also be contaminated.

Furthermore, in known OBD systems, the problem arises that the minimum injection quantity which can be applied by an injection system is normally subject to an age-induced rise unless suitable countermeasures are taken.

For example, a combustion application specifies a nominal injection quantity of 1 mg. A new injection system provides this nominal quantity and the desired consequences are achieved. An aged injection system may not be able to provide this nominal quantity, since the parameters or components of the injection system have deteriorated. For example, an aged injection system requires an actuation to produce 1 mg, wherein this actuation in new state would have corresponded to 3 mg.

EP 1 420 157 B1 discloses a method for determining the injection quantity of an internal combustion engine, which method includes: a main injection of fuel; a determination of the rotary acceleration of the crankshaft caused by the main injection; a determination of the main injection quantity from the determined rotary acceleration of the crankshaft; and a secondary injection of fuel after the main injection; wherein furthermore at least part of the exhaust gas from the internal combustion engine is returned with the secondarily injected fuel into the intake tract of the internal combustion engine; the additional rotary acceleration of the crankshaft caused by the secondary injection and the exhaust gas recirculation is determined to establish the exhaust gas recirculation rate; and the secondary injection quantity is determined from the additional rotary acceleration of the crankshaft and the exhaust gas recirculation rate.

WO 2009/013058 A1 describes a method for determining a fuel mass of a pre-injection injected under high pressure during at least one injection into at least one combustion chamber of an internal combustion engine, in which by means of a comparison between a dimension for the actual quantity of injected fuel of at least one test secondary injection which is performed on the basis of a dimension for a predefined nominal quantity of a desired pre-injection, and the dimension for the nominal quantity, a correcting variable is established for the pre-injection.

DE 10 2006 023 468 B3 discloses a method and a device for controlling an injection valve of an internal combustion engine, in which a deviation between a predefined nominal value and an actual value of a fuel quantity injected into a combustion chamber of an internal combustion engine is compensated. The fuel is injected into the internal combustion engine by means of several injection valves of an injection system during operation of a motor vehicle, and the deviation between the predefined nominal value and the actual value of the injected fuel quantity is determined by detecting the pressure fall in a fuel rail of the injection system. This is achieved in that during an overrun fuel-cutoff phase, a test phase is initiated in which initially a defined stable state is established in the fuel rail; after reaching the stable state, a first pressure value is determined in the fuel rail with the first pressure measurement; then at least one injection valve is selected which is actuated for a test injection with a predefined nominal quantity; after the test injection, a second pressure value is determined with a second pressure measurement in the fuel rail; from the two determined pressure values, a difference value is calculated and from the calculated difference value, a correction factor is determined with which the actuation of the selected injection valve is corrected. For the test injection, a very small fuel quantity is used which corresponds to the fuel quantity of a pre-injection or secondary injection or a heating injection for the catalytic converter.

DE 10 2010 004 299 B3 describes a method and a device for operating injectors with piezo drive, in which the electrical capacitance and hence the present temperature level of the piezo drive are measured using test pulses. Depending on the measured capacitance values, the relative change in injection quantity of an injector is determined. This injector is then actuated to perform an injection taking into account the relative change in injection quantity. In this way, the injection quantity can be kept stable via the temperature.

EP 2 136 058 A1 describes a method for adapting the injector characteristics of fuel injectors of a multi-cylinder internal combustion engine which has combustion chambers with direct fuel injection, wherein the injector characteristics are adapted individually for each injector in order to compensate for deviations of the individual injectors from standard injectors. Here, fuel is injected by each injector and the resulting engine reaction is determined. Furthermore, in the known method, for each cylinder a value is determined for the peak pressure or a given mean pressure, which pressure value occurs during a combustion cycle in the combustion chamber of the cylinder. Furthermore, the injector characteristics are modified individually for each injector, in order to compensate for differences in pressure values between cylinders.

SUMMARY

An object of the invention is to provide an improved method for identifying faulty components of a fuel injection system.

According to the method for identifying faulty components of a fuel injection system, a secondary injection is performed individually by each injector during a test routine, after the secondary injection several predefined parameters of the fuel injection system are determined, and a combined assessment of the determined parameters is used to draw conclusions about whether or not components of the fuel injection system are faulty.

This combined assessment of the determined parameters increases the reliability and precision of monitoring of an on-board diagnosis system.

In an embodiment, the parameters are the rail pressure, the injector voltage and the residual oxygen in the exhaust gas or the air ratio. These parameters are three signals which are linearly independent of each other or orthogonal, the combined assessment of which gives particularly reliable results and allows safe identification or definition of a fault cause.

A method according to an embodiment of the invention is particularly suitable for auto-ignition internal combustion engines with piezo common rail injection systems, with directly driven injectors or servo valve injectors (diesel engines and petrol engines).

Furthermore, using the method, many systems of an internal combustion engine may be tested, in particular the components of a complete injection system.

The method is used in stable operating conditions which occur in particular when the vehicle is stationary in a workshop. It may however also be used in normal operation of a motor vehicle.

An embodiment includes of implementation of the method not by an engine control unit but by an external test device. This may take place in a workshop or in the factory at the end of vehicle production.

A further time for performing a method according to an embodiment of the invention is the time of first commissioning the motor vehicle. At this time, defined operating media (fuel, oil) are present which meet the first-fill standard of the respective motor vehicle. Furthermore, trained personnel are available at this time.

In the case of performance of the method in a workshop, before the start of the method, workshop personnel exclude certain faults, for example faults on the vehicle wiring loom, leaks in the high-pressure system of the vehicle, and filling with an incorrect fuel type.

When the method according to an embodiment of the invention is used in normal operation of a motor vehicle, before the start of the method, the results of various system diagnoses are checked, for example, the results of a cylinder equalization diagnosis, and diagnoses of all sensors and actuators involved, in order to ensure the reliability of the results of the method.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

Further properties of the invention arise from the exemplary explanation below, given with reference to the figures. In the drawings.

DETAILED DESCRIPTION

Figure 1:
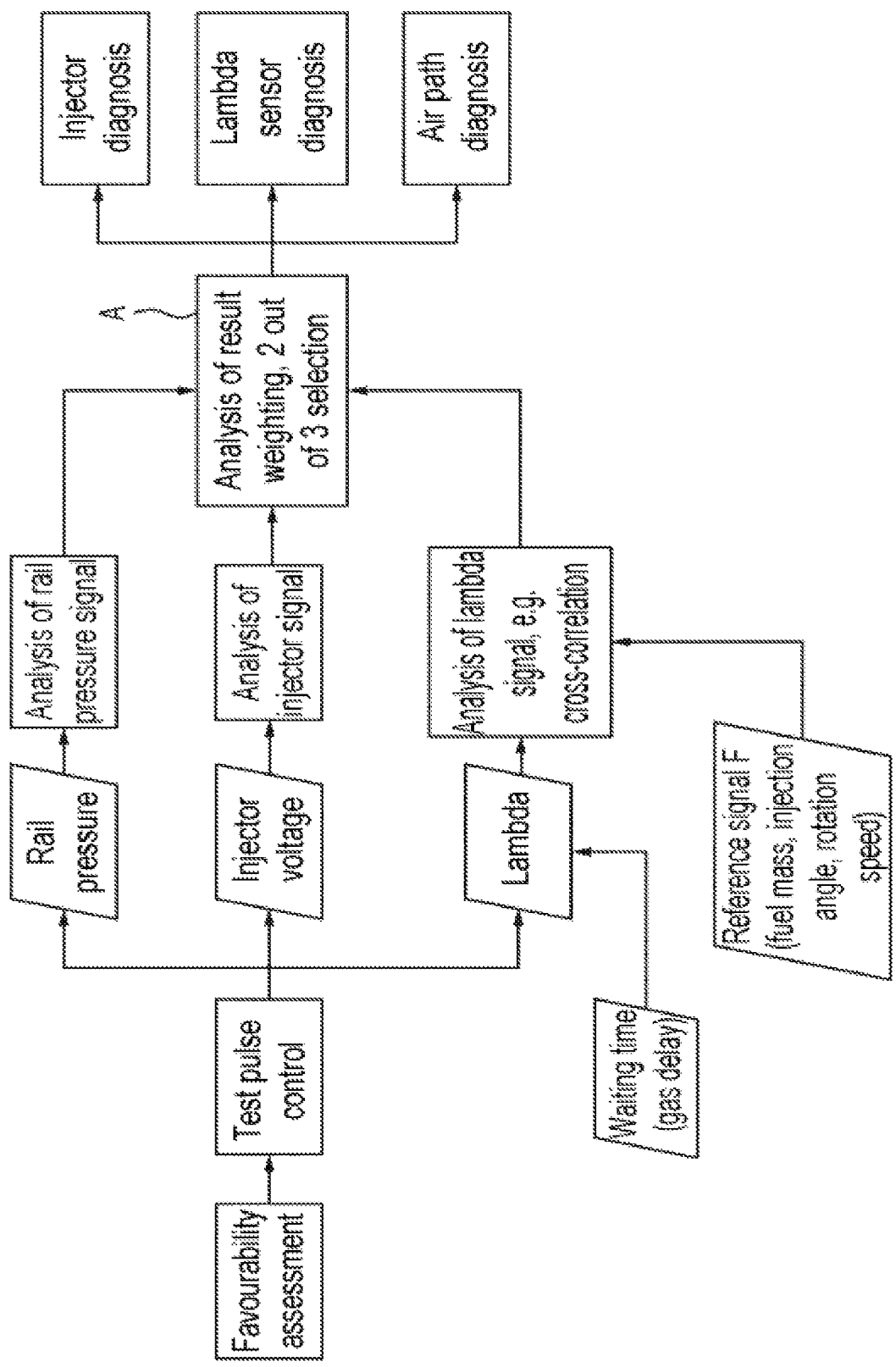
FIG. 1 shows a sketch to explain a method for identifying faulty components of a fuel injection system.

FIG. 1 shows a sketch to explain a method for identifying faulty components of a fuel injection system.

Before starting the method, first a favorability assessment is performed. This favorability assessment, on use of the method in normal operation of a motor vehicle, includes performing predefined system diagnoses and checking the results thereof. These system diagnoses include, for example, a cylinder equalization diagnosis, and a diagnosis of the function capacity of sensors and actuators arranged on components of the injection system.

In the case of use of the method in a workshop, the favorability assessment includes workshop personnel excluding certain faults, for example faults on the vehicle wiring loom, leaks in the high-pressure system of the motor vehicle, and filling with an incorrect fuel type.

If the favorability assessment performed gives positive results, then stable engine operating conditions are present so that the method for identifying faulty components of the fuel injection system may begin.

In this method, test pulses in the form of secondary injections are provided for individual injectors by a control unit. For example, firstly a secondary injection is performed with a predefined nominal fuel quantity, at an angle of 70° after top dead centre. Then further secondary injections are performed, for example at five successive segments on the same cylinder, with the same nominal fuel quantity.

After performing the respective secondary injection with the predefined nominal fuel quantity, the reaction of the fuel injection system to the respective secondary injection is assessed. Here, as illustrated in the top branch of FIG. 1, the rail pressure is measured by means of the rail pressure sensor, and rail pressure signals are prepared and supplied to an analysis unit A. Furthermore, as illustrated in the middle branch of FIG. 1, the injector voltage is measured by means of a voltage sensor, and injector voltage signals are supplied to the analysis unit A. Furthermore, as illustrated in the lower branch of FIG. 1, the air ratio is measured by means of a lambda sensor, and signals characteristic of the air ratio are supplied to the analysis unit A.

The air ratio is measured such that a first measurement result gives information on the burnt proportion of the fuel quantity at the lambda sensor, and a second measurement result gives information on the evaporated proportion of fuel quantity at the lambda sensor. This procedure gives information on the individual HC offset of the sensor. The two measurement results are obtained by varying the start of injection (SOI) of the secondary injection. In order to obtain correct measurement results, the gas delay which is dependent on engine rotation speed is noted, as illustrated at the bottom left of FIG. 1. The measurements may only be made after a light-off of the exhaust gas aftertreatment system. The two measurement results for the air ratio are subjected to secondary processing, for example cross-correlation or auto-correlation. The result obtained is supplied to the analysis unit A as a signal characterizing the air ratio.

Then a slightly higher nominal fuel quantity is predefined, and the measurements and analyses described above are repeated.

These repetitions are performed with ever-increasing nominal fuel quantity as long as all analysis functions have the result that firstly a significant signal is detected, i.e. the triggered injection quantity has led to a perceptible change in the measured rail pressure and/or air ratio, and secondly the amount of the increase in nominal quantity has led to a differential value in the measured signal.

With the method described above, next a cyclic change in the angle of the test injection or secondary injection is performed while maintaining the respective predefined test injection quantity. This means that the secondary injection takes place once at a time at which the fuel is still burning but giving no perceptible torque contribution, e.g. at 70° after top dead centre, and once at a time at which the fuel is no longer burning, e.g. at 150° after top dead centre. This allows firstly the effect of the burned fuel quantity and secondly the effect of the vaporized fuel quantity in the probe signal to be seen.

The detection and analysis of the air ratio in each case takes place at a time determined empirically in advance, or at an expected time period. The time of injection, the rotation speed-dependent gas delay, and an input filter time constant of the air ratio detection, are taken into account in determining this time or time period.

By means of the above-mentioned cross-correlation or auto-correlation, the signal-noise interval is improved.

In the case of cross-correlation, on the engine test bench a reference signal is recorded and the measurement or feedback signals obtained are analysed in the time range and in the spectral range.

In the case of auto-correlation, the measured air ratio with uniform engine running is tested for self-similarity after the end of the settling processes in the fuel and air path of the engine. Suitable selected secondary injections here provoke a deviation in the course of the lambda signal. Auto-correlation gives as a result a signal which allows, from a minimal injection quantity which may be created by an injection system, a distinction between whether or not an injection process is present.

Amongst others, in the analysis unit, comparisons are made between the respective identified minimal signal significance and a minimal signal significance identified in another branch, for example a comparison between the minimal signal significance identified in the rail pressure branch and the minimal signal significance identified in the air channel, and a comparison between the minimal signal significance identified in the air path branch and the minimal signal significance identified in the injector voltage branch, in order to increase the reliability of the diagnosis.

Furthermore, in the analysis unit, a combined analysis of the parameters supplied takes place in order to be able to draw conclusions on whether or not components of the fuel injection system are faulty.

If, for example, the rail pressure signals, the injector voltage signals and the signals characterizing the air ratio lie in the expected range, it is concluded that the fuel injection quantity is fault-free, i.e., in order.

If, however, the rail pressure signals and the injector voltage signals lie in the expected range, but the signals characterizing the air ratio do not, it is concluded that there is either a fault in the lambda sensor or a fault in the air path.

If however the injector voltage signals lie in the expected range, but the rail pressure signals and signals characterizing the air ratio do not, it is concluded that the fuel flow through the injector is faulty, i.e., not in order.

Consequently, the prescribed combined analysis of the determined parameters allows identification of a fault location, in particular an identification of whether a fault is present in the injector, the lambda sensor or the air path.

Figure 2:
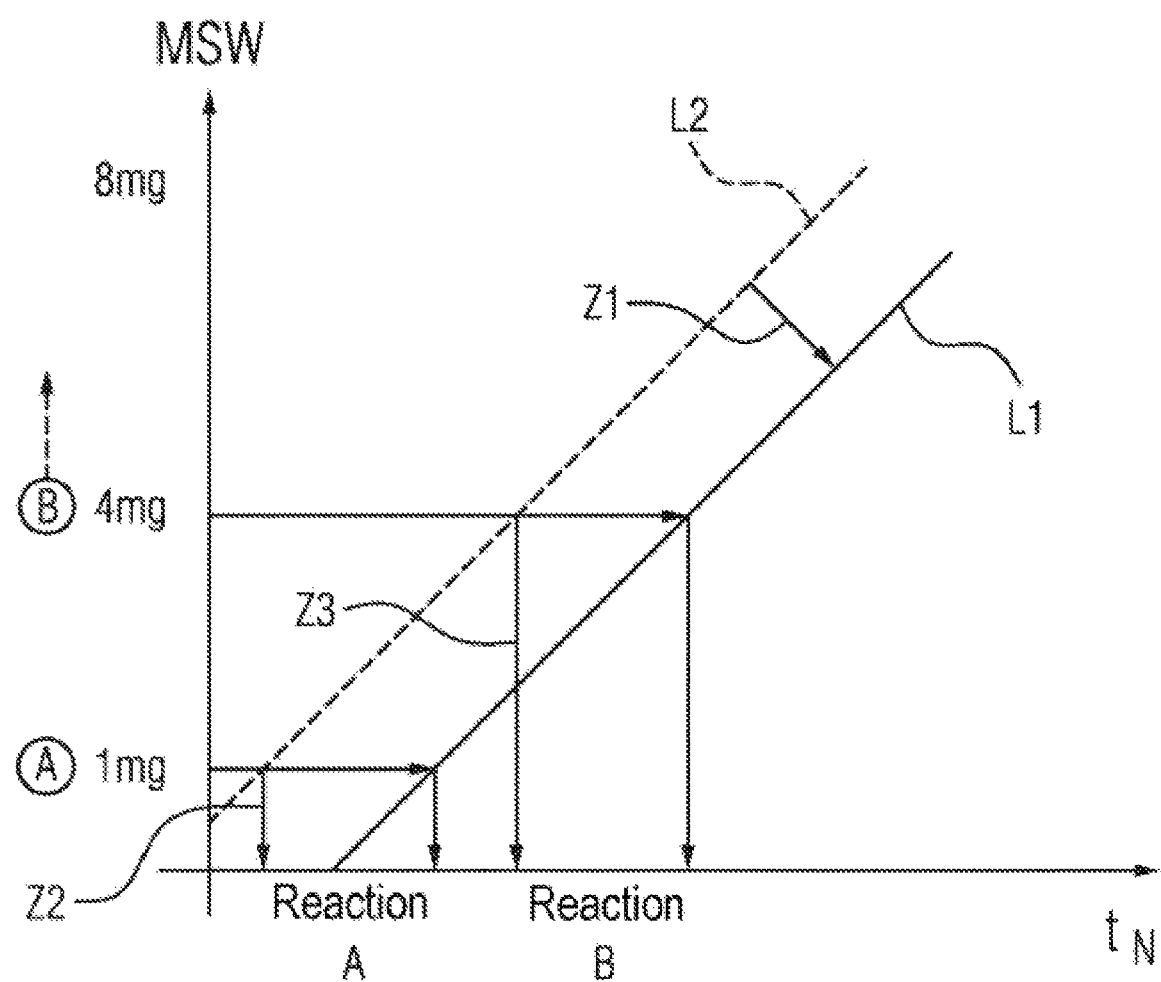
FIG. 2 shows a diagram to illustrate the correlation between the fuel injection quantity predefined by test pulses, and the reaction of the injection system depending on time.

FIG. 2 shows a diagram to illustrate the correlation between the fuel injection quantity predefined by the test pulses, and the reaction of the injection system depending on time. The ordinate shows the nominal fuel quantity MSW of the test pulse, i.e. the secondary injection, and the abscissa shows the elapsed time $t_N$ since the end of the secondary injection.

The continuous line L1 in the diagram is a standard curve as expected from a new or perfect injector. This standard curve is determined empirically during the development period. The dotted line L2, which typically runs parallel to the continuous line, illustrates the fact that on an aged or damaged injector, the test pulses provoke no reaction, or a reaction at a time other than expected, or with an amplitude other than expected.

A fault-free injector in new condition delivers an injection quantity A, for example 1 mg, for an actuation period T1 which corresponds to a calibration originally performed. This injection quantity A leads to reactions in the above-mentioned measurement signals which occur at expected times, counted from the start or end of the actuation period T1, and have expected amplitudes which are also known from the calibration originally performed. The actuation period T1 may be used repeatedly in several working cycles of the engine to form a statistic, for example a mean value formation.

Furthermore, a fault-free injector in new condition supplies, for a second actuation period T2, a second injection quantity B which also provokes reactions at expected times with expected amplitudes. Here too, the second actuation period T2 may be used repeatedly in several working cycles of the engine to form a mean value.

As a result, an expected difference between the reactions obtained may be formed.

The actuation periods T1 . . . Tn of the test pulses may be used in both the rising and the falling directions, i.e. starting with short periods towards longer periods, or vice versa.

The arrow, marked Z1 in FIG. 2, between the dotted and continuous lines shows that use of the identified or detected measurement values of the parameters for smaller injections "pulls" the injector back towards the standard curve, and allows use and application of small fuel quantities.

In general, a test injection leads to reactions in the injector feedback signals, for example in the measurement signals which describe the course of the injector capacity or the injector voltage. These reactions are interpreted as the nozzle closing time OPP4. A shift towards a time earlier than expected, as indicated by arrows Z2 and Z3, is interpreted as too early a nozzle closure, which is normally accompanied by an injection quantity which is smaller than expected for the actuation period T1. Accordingly, a shift towards a time later than expected is interpreted as too late a nozzle closure, which is normally accompanied by an injection quantity which is greater than expected for the actuation period T1.

Usually, a quantity drift of an injector is expressed in a parallel shift of the current injector curve relative to the standard curve.

If we now form the temporal difference T_expected—T_actual, and add this in a suitable fashion to the actuation period T1, we obtain the actuation period which is necessary for an aged injector to achieve the desired fuel quantity.

The same test injection also leads to a reaction in the signal PFU-SIG of the rail pressure sensor, in particular a fall in the rail pressure sensor corresponding to the fuel volume taken from the rail. The rail pressure results from the balance of the fuel volume supplied and extracted. A variation in the injection angle of the test injection means that the phase angle of the test injection is varied relative to the pumping phase, or the distance from the main injection. Consequently, the test injection takes place at different positions relative to the pressure wave in the rail caused by the pump stroke and/or the main injection. Different expectation values are provided for different angles.

Furthermore, the same test injection leads to a reaction in the amperometric oxygen sensor in the exhaust gas path. The expected time of this signal depends amongst others on the gas delay between the cylinder exhaust valve and the site of the lambda sensor. The gas delay depends on fixed geometric conditions and the air mass speed or air mass throughput. Further influencing variables are the engine rotation speed, the boost pressure and the exhaust gas backpressure. Furthermore, the amplitude of the reaction of the lambda sensor depends on the fuel type, the injection quantity and the degree of conversion.

Figure 3:
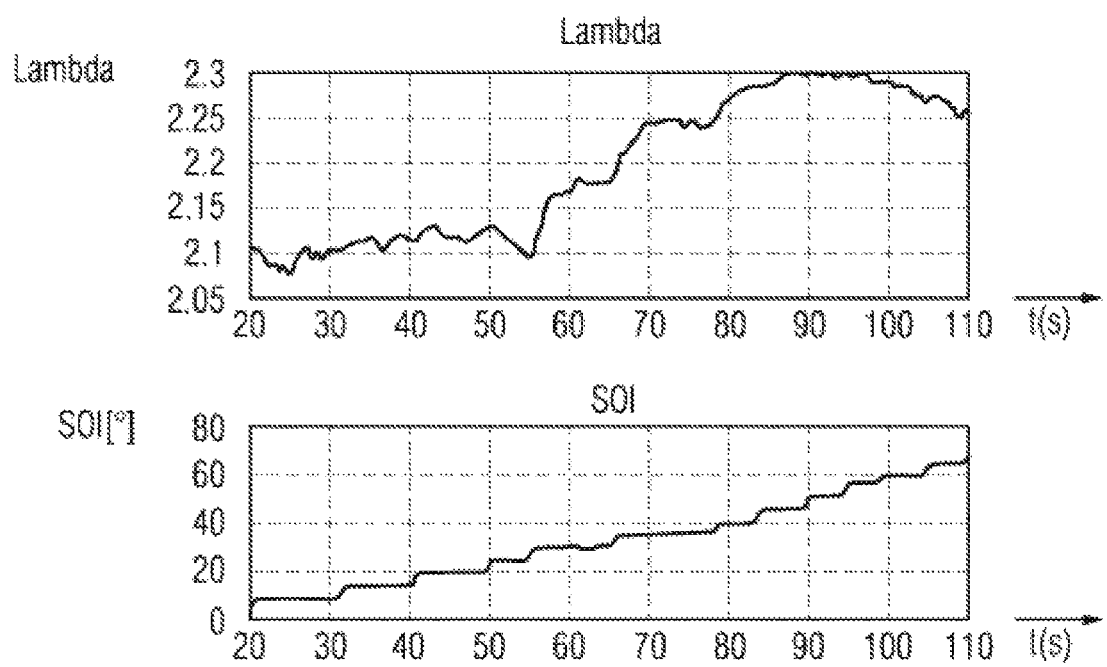
FIG. 3 shows diagrams to illustrate the behavior of the air signal $\lambda$ on a stepped increase in the secondary injection angle.

FIG. 3 shows diagrams to illustrate the behavior of the air signal lambda on a stepped increase in secondary injection angle with a constant fuel quantity. The lower diagram shows the cause, i.e., the stepped increase in injection angle, and the upper diagram shows the effect, i.e. the resulting air ratio values. It is evident that the proportion of burned partial injection quantity of the test injection quantity, and hence the consumption of free molecular oxygen, falls as the injection angle after top dead centre increases. The unburned hydrocarbons are thermally/catalytically converted on the hot surface of the sensor, but the effect in the measurement signal is not identical to that of combustion of the same quantity of fuel.

Figure 4:
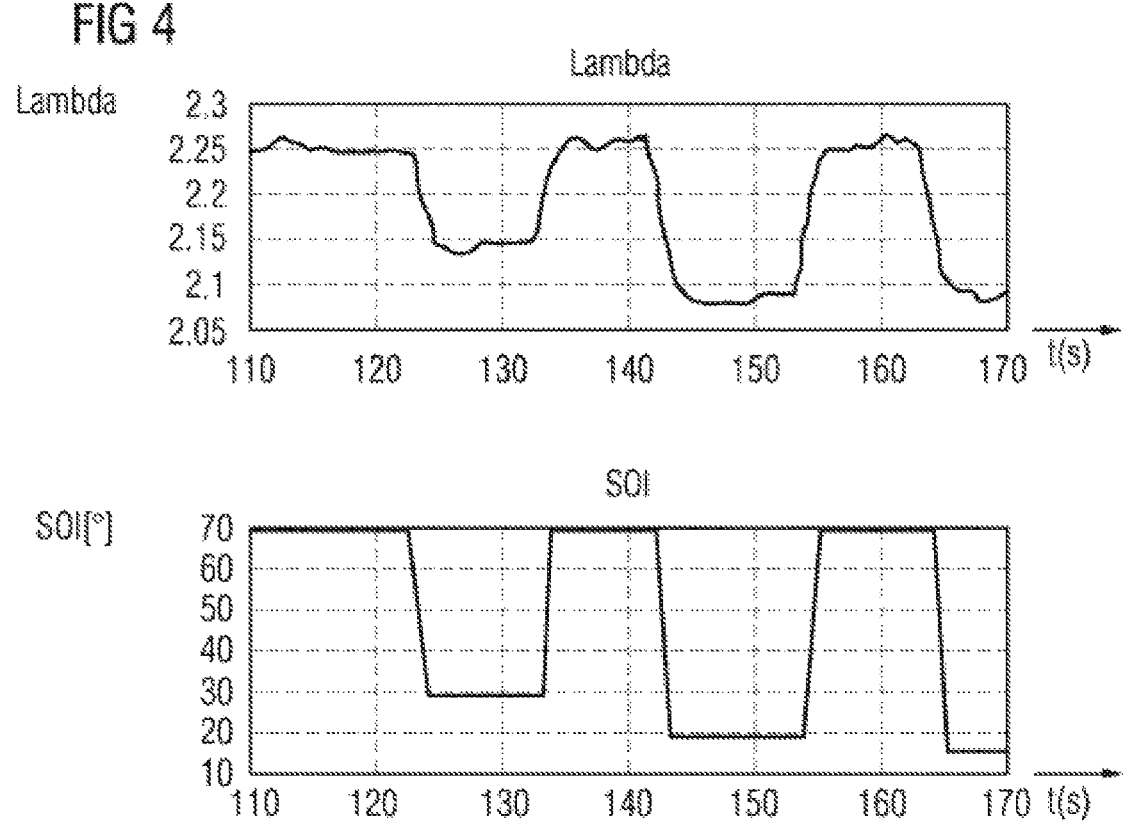
FIG. 4 shows diagrams to illustrate the behavior of the air signal $\lambda$ on a sudden change in the injection angle.

FIG. 4 shows diagrams to illustrate the behavior of the air signal lambda on a sudden change in the injection angle with a constant fuel quantity. The lower diagram again shows the cause, i.e., the sudden change in injection angle, and the upper diagram shows the effect, i.e., the resulting air ratio values.

FIGS. 3 and 4 illustrate the correlation principle between the secondary injection angle and the lambda signal. The difference in the function is that, with the gradual increase in test injection quantity according to FIG. 3, points may be established for calculating the linear equation of the dotted line. In particular, the "foot point" may be identified, i.e. the minimum actuation period which gives a significant signal stroke for the first time. A new injector normally gives the first significance for a lower actuation period. Since the system described above is however controlled via the nominal quantity MSW (see ordinate in FIG. 2), a higher test pulse nominal quantity which corresponds to a longer actuation period is given for the same actual quantity.

The embodiment of the invention described above may advantageously be applied if a model-based air path is calculated in which the model values are based on the nominal fuel quantity. The better the fuel quantity actually delivered correlates with the required nominal values, the better the calculated model values for the air path or the actuation parameters for the control components of the air path, and the more successful the adjustment of the engine working point, and the better the optimisation of the exhaust gas raw emissions and/or fuel consumption of the engine.

An improved diagnostic capability of the injection system also leads to improved pinpointing, i.e. improved identification of a faulty component of the fuel injection system.

A number of implementations have been described. Nevertheless, it will be understood that various modifications may be made without departing from the spirit and scope of the disclosure. Accordingly, other implementations are within the scope of the following claims.

The invention claimed is:

1. A method for identifying faulty components of a fuel injection system having one or more injectors, the method comprising:
    performing a secondary injection individually by each injector during a test routine,
    after the secondary injection several, determining predefined parameters of the fuel injection system, and
    generating a combined assessment of the determined predefined parameters and determining whether or not components of the fuel injection system are faulty based upon the combined assessment,
    wherein the fuel injection system comprises a fuel rail, each of the one or more injectors is controlled using an injector voltage signal, and the predefined parameters are the pressure of the fuel rail, each injector voltage signal and an air ratio of the fuel injection system,
    wherein determining whether or not components of the fuel injection system are faulty comprises, if each injector voltage signal lies in the associated expected range, and the rail pressure and air ratio lie outside their respective expected ranges, identifying a flow quantity of the one or more injectors as faulty, and
    wherein performing the secondary injection comprises changing an angle of the secondary injection while maintaining fuel injection quantity.

2. The method as claimed in claim 1, wherein determining whether or not components of the fuel injection system are faulty comprises, if the rail pressure, the injector voltage and the air ratio each lies in an expected range, identifying a fuel injection quantity of the secondary injection as fault-free.

3. The method as claimed in claim 1, wherein the fuel injection system comprises a lambda sensor, and determining whether or not components of the fuel injection system are faulty comprises, if each injector voltage signal and the rail pressure each lies in the associated expected range, and the air ratio does not lie in the associated expected range, identifying a presence of a lambda sensor fault or an air path fault.

4. The method as claimed in claim 1, further comprising, before performing the secondary injection, performing a favorability assessment.

5. The method as claimed in claim 1, wherein changing the angle of the secondary injection comprises changing the angle of the secondary injection with a modified fuel injection quantity.

6. The method as claimed in claim 1, wherein performing the secondary injection comprises changing the fuel injection quantity until a combined analysis of the predefined parameters shows that a current fuel injection quantity leads to a measurable change in all predefined parameters.

7. The method as claimed in claim 1, wherein creating a combined assessment of the predefined parameters comprises using a cross-correlation.

8. The method as claimed in claim 1, wherein creating a combined assessment of the predefined parameters comprises using, an auto-correlation of the predefined parameters.

9. The method as claimed in claim 1, wherein in performing the secondary injection, at least one of a duration and a start of the secondary injection is changed.

10. The method as claimed in claim 1, wherein a fuel injection quantity of the secondary injection is less than 3 mg.

11. The method as claimed in claim 1, wherein a fuel injection quantity of the secondary injection is less than 1 mg.

12. A method for identifying faulty components of a fuel injection system having one or more injectors, the method comprising:
    performing a secondary injection individually by each injector during a test routine,
    after the secondary injection several, determining predefined parameters of the fuel injection system, and
    generating a combined assessment of the determined predefined parameters and determining whether or not components of the fuel injection system are faulty based upon the combined assessment,
    wherein the fuel injection system comprises a fuel rail, each of the one or more injectors are controlled using an injector voltage signal, and the predefined parameters are the pressure of the fuel rail, each injector voltage signal and an air ratio of the fuel injection system, and
    wherein the fuel injection system comprises a lambda sensor, and determining whether or not components of the fuel injection system are faulty comprises, if each injector voltage signal and the rail pressure each lies in the associated expected range, and the air ratio does not lie in the associated expected range, identifying a presence of a lambda sensor fault or an air path fault.

13. The method of claim 12, wherein determining whether or not components of the fuel injection system are faulty comprises, if the rail pressure, each injector voltage signal and the air ratio each lie in associated expected ranges, identifying a fuel injection quantity of the secondary injection as fault-free.

14. The method of claim 12, wherein performing the secondary injection comprises changing an angle of the secondary injection while maintaining fuel injection quantity.

15. The method of claim 14, wherein changing the angle of the secondary injection comprises changing the angle of the secondary injection with a modified fuel injection quantity.

16. The method of claim 14, wherein performing the secondary injection comprises changing the fuel injection quantity until a combined analysis of the predefined parameters shows that a current fuel injection quantity leads to a measurable change in all predefined parameters.

17. The method of claim 12, wherein creating a combined assessment of the predefined parameters comprises using an auto-correlation of the predefined parameters.

* * * * *